Sept. 6, 1932. W. F. MOTTIER 1,875,349
HAY RAKE
Filed Jan. 8, 1931 2 Sheets-Sheet 1
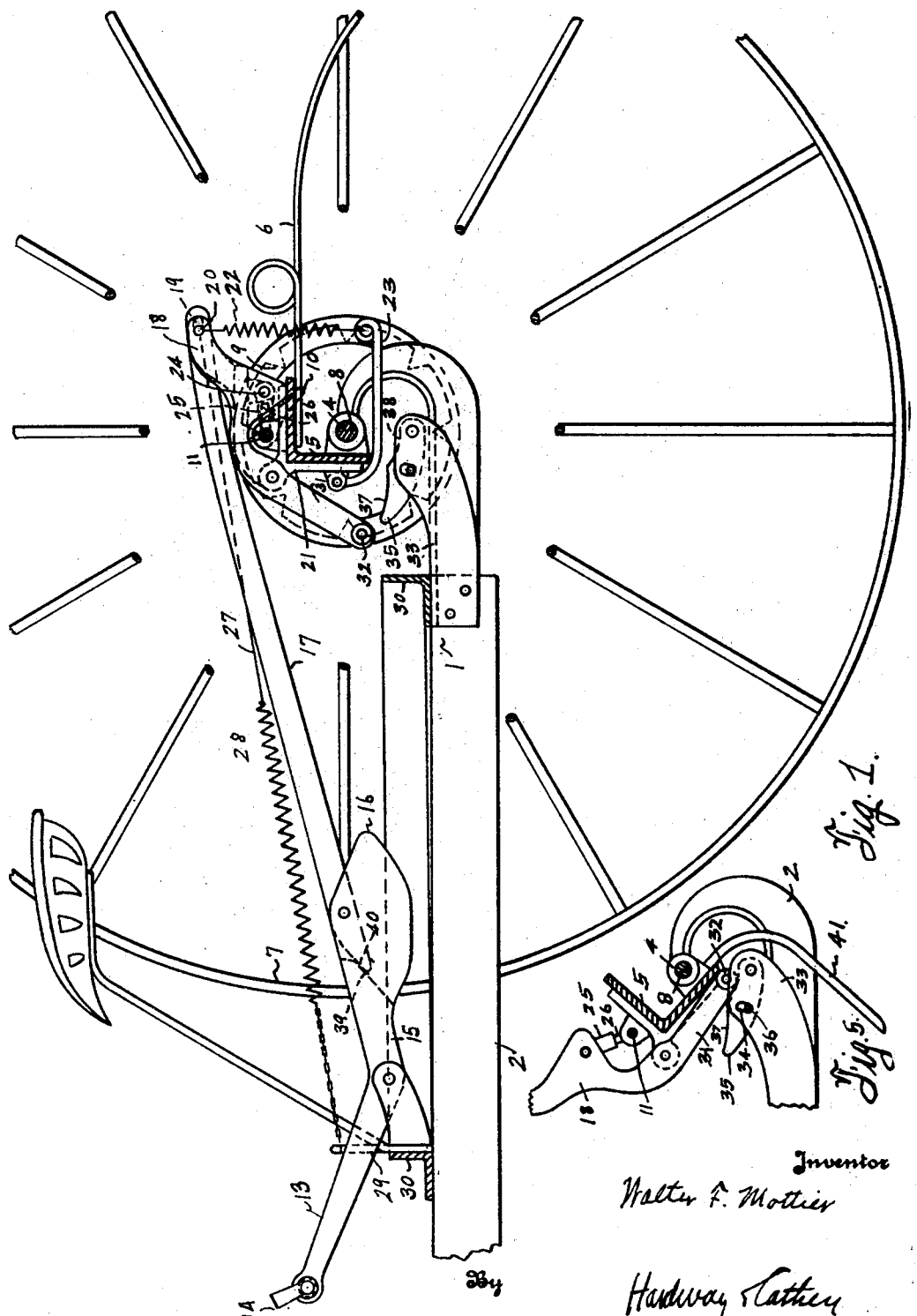

Sept. 6, 1932. W. F. MOTTIER 1,875,349
HAY RAKE
Filed Jan. 8, 1931 2 Sheets-Sheet 2
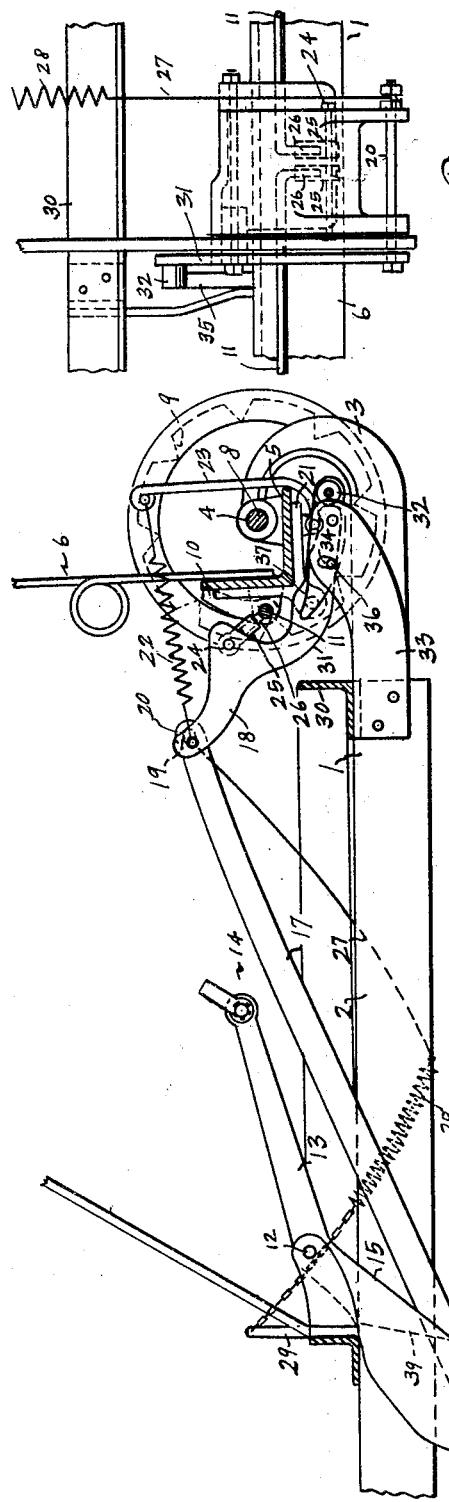
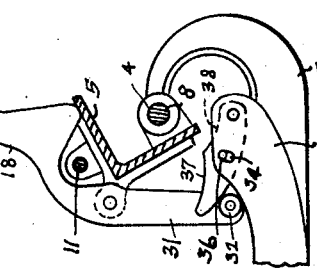
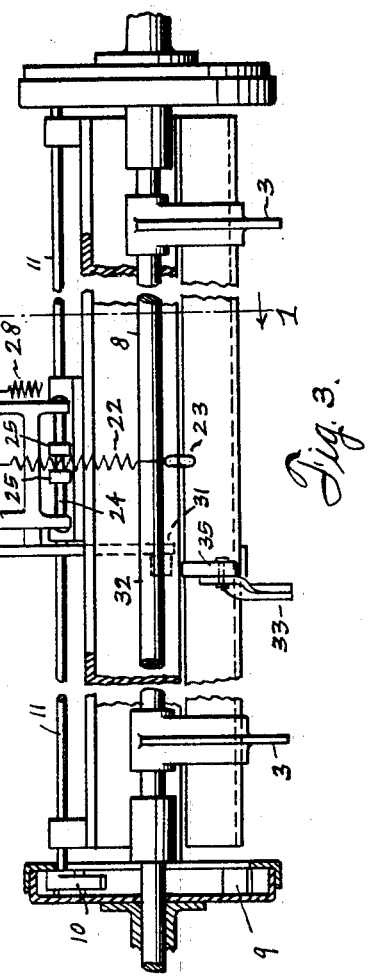
Inventor
Walter F. Mottier
Hardway Mathey
By
Attorneys Patented Sept. 6, 1932

1,875,349

UNITED STATES PATENT OFFICE

WALTER F. MOTTIER, OF EL CAMPO, TEXAS

HAY RAKE

Application filed January 8, 1931. Serial No. 507,451.

This invention relates to a novel type of hay rake and has particular relation to a machine constructed for the purpose of raking hay and similar material.

One object of the invention is to provide a rake of the character described embodying improved means for controlling the dumping movements of the rake.

Other and more specific objects of the invention reside in the provision of a machine of the character described having—means for effecting the automatic dumping movement of the rake head; a trip plate pivotally mounted on the rake head and forming means through which the rake head may be held in raking position or tripped to effect the dumping movement thereof; means through which the operator may temporarily hold the rake head in dumping position; manually operable means for tripping the tripplate, and connected to said plate in such a manner as to arrest the dumping movement of the rake head to cause the disengagement of the dogs from the ground wheels to permit the rake head and teeth to return to raking position; means to determine the cycle of movement of the trip plate after it is once tripped to permit the dumping movement of the rake head and teeth.

The controlling means herein described are adaptable to different types of hay rakes, and the invention relates primarily to a means for controlling the movements of the rake proper and for positively locking the rake head in and out of engagement with the wheels rather than to the machine in its entirety.

With the above and other objects in view, the invention has particular relation to certain novel features of construction, operation and arrangement of parts, an example of which is given in this specification and illustrated in the accompanying drawings, wherein:

Figure 1 shows a fragmentary, longitudinal, vertical sectional view of the rake shown in raking position, taken on the line 1—1 of Figure 3.

Figure 2 shows a fragmentary, longitudinal, vertical sectional view of the rake showing the mechanism in dumping position also taken on the line 1—1 of Figure 3.

Figure 3 shows a fragmentary rear view of the rake partly in section.

Figure 4 shows a fragmentary plan view of the rake.

Figure 5 shows a fragmentary vertical sectional view showing the trip plate and associated parts as moving toward dumping position, and Figure 6 shows a similar view of said parts as moving toward return position.

Referring now more particularly to the drawings, wherein like numerals of reference designate similar parts in each of the figures, the numeral 1 designates the main frame to which the thills, as 2, are attached for draft purposes.

Extending rearwardly from the frame are the arms, as 3, said arms being so formed as to provide a pivotal mounting, as at 4, for the angle bar 5, which serves as a rake head to which the rake teeth 6 are secured. The arrangement of these parts is such that the rake teeth will lie close to the ground as shown in Figure 1, when in raking position.

For the purpose of manually operating the rake teeth, a connection is arranged between the rake head 5 and the ground wheels 7 which support the axle 8, and upon which the machine travels. These wheels are mounted for rotation at opposite ends of the rake head and each is formed with an inside ratchet 9 which may engage dogs 10, secured to the outer ends of the rods 11, which are pivotally mounted on the rake head. Normally these dogs remain disengaged from the corresponding ratchets but they are required to engage therewith when the rods 11 are moved for this purpose. It will be noted that the rods 11 are eccentric with respect to the wheels 7 so that engagement of the dogs with the ratchets will necessarily result in locking the rake head with the wheels for movement therewith. The rake teeth will thereby be raised, through a predetermined distance, and thereupon the dogs are again released from engaging position, as hereinafter explained, to permit the rake teeth to descend again to raking position.

The general construction above described in effect provides simply a lock between the rake head and wheels so that the teeth will be properly raised to a dumping position, with provision for releasing said dogs to permit the rake head and teeth to return to raking position.

In the form of the rake herein described, provision has been made for positively locking the dogs in either position, that is, in engagement with the ratchet teeth or in released position therefrom and for accomplishing said operations hereinabove referred to in a novel manner and by a novel construction in which respects the type of rake herein described embodies certain distinct improvements over the means heretofore used in rakes for controlling the dogs referred to and actuating them into or out of engaging position.

Pivotally mounted upon the frame of the machine, as at 12, there is a pedal 13 which is preferably operated by foot and may be equipped with a suitable strap or stirrup 14 for facilitating both push and pull movements. The lower end of this pedal has a rigid lever 15 whose free end is bifurcated forming spaced plates as 16, 16 between which one end of the link 17 is pivoted, and the other end of this link has a pivotal sliding connection with the upper end of the yoke shaped trip plate 18. The last mentioned end of said link has an elongated slot 19 to receive the cross rod 20 of said trip plate. The trip plate is mounted for pivotal movement on the rake head, preferably by means of a suitable bracket 21 fastened to the forward side of the rake head. This trip plate, in normal position, rests against the rake head and there is a pull spring 22 connected at its upper end to the cross rod 20 and at its lower end to the rearwardly extending arm 23 which is fastened, in any suitable manner, also to the rake head. Pivotally mounted on the cross rod 24 of the trip plate are the forwardly extending tubular bearings 25, 25 and the inner ends 26, 26 of the rods 11 are overturned and fitted into said bearings 25, 25.

There is a connecting member 27 having a yieldable section 28. The rear end of this connecting member is attached to the cross rod 20 and its forward end is attached to a stationary anchor 29 which is fixed to the cross bar 30 of the main frame 1.

The trip plate 18 has an extended arm 31 having a lateral bearing 32 and fixed to the cross bar 30 and extending rearwardly therefrom there is a cam bracket 33 provided with a vertically extended slot 34. The rear end of a cam 35 is pivoted to the bracket 33 and has a lateral pin 36 which works in the slot 34. The upper side of said cam has the arcuate bearing face 37 forming the arc of a circle of which the axis of the pivotal point of the trip plate on the bracket 21 is a center and the upper margin of said cam also has an arcuate bearing face 38 forming the arc of a circle of which the pivotal point 4 is the center. The forward free end of the cam has a free vertical movement whose range is limited by the pin 36 which moves in the slot 34. The rake teeth are in raking position as shown in Figure 1 and while in this position the lever 15 is in substantially straight line relation with the link 17 and a very slight pressure by the operator on the pedal 13 is sufficient to maintain such relation of the lever 15 and link 17. Between the plates 16 there is an abutment 39. Against this abutment the corresponding end 40, of the link 17, abuts so as to maintain such straight line relation irrespective of the downward pressure on the pedal 13 by the operator. In this position, the cross rod 20 abuts against the forward end of the slot 19 to take the strain of the load. In order to now cause the rake to dump the pedal 13 is released and, if necessary, pulled slightly upwardly and thereupon the yieldable section 28 will automatically pull the upper end of the trip plate 18 forwardly, said trip plate swinging about its pivot on the bracket 21, until stopped by the engagement of the arm 31 with the rake head. This movement will cause a partial rotation of the rods 11 carrying the free ends of the dogs 10 up into engaging relation with the ratchet teeth 9 and at the same time the bearing 32 will move into contact with and will travel along the cam face 37. The connecting member 27 is not indispensable but if used it will cause the automatic tripping of the trip plate 18 upon a slight upward movement of the pedal 13. If the connecting member 27 is not used, the pedal 13 must, of necessity, be manually actuated rearwardly to cause the tripping of the trip plate 18 with the result stated. Upon the engagement of the dogs 10 by the ratchet teeth 9 the rake head and the appendants thereof will be rotated forwardly by the wheels 7 into the position indicated in Figure 2 and the rake teeth will be elevated, thus dumping the load. During this latter movement the bearing 32 will travel along the cam face 38 and will pass down behind the rear end of said cam 35. The cross rod 20 will now engage the forward end of the slot 19 and the link 17 will arrest the further forward movement of the trip plate 18 and the further movement of the rake head with the wheels will cause a relative backward rotation of the rods 11 thus disengaging the dogs 10 from the ratchet teeth 9 and this will release the rake head and the weight of the teeth will move them back into raking position. During this backward movement of the rake head and teeth the bearing 32 will ride around underneath and in contact with the cam 35, as illustrated in Figure 5, and will elevate the free forward end of said cam and during this movement the trip plate will be carried backwardly around with the rake head, the lever 15 and link 17 again assuming a straight line relation and a yieldable section 28 being again placed under tension. The bearing 32 riding against the under side of the cam 35 will operate to compel the trip plate 18 to sustain this tension and will prevent the premature tripping of said plate thereby until the bearing 32 has passed the free forward end of said cam at which time the pedal 13 will be in its forward position and the operator may thereafter hold said pedal in position to prevent the tripping of the plate 18 until it is again desired to dump the load. When the bearing 32 passes the free end of the cam 35 said free end will drop down again below the path of movement of said bearing on its next succeeding cycle of movement, so that the bearing will again be in position to engage the face 37 upon the beginning of its next cycle of movement.

If, when the dogs 10 have been released from the ratchet teeth 9, it should be desired to temporarily prevent the return of the rake teeth to raking position the operator may hold the pedal 13 in its rearward position, as shown in Figure 2, and this will cause the bearing 32 to engage against the rear end of the cam 35 and temporarily suspend the further movement of the rake head and teeth toward raking position. Upon the release of the pedal the return movement of the rake head and teeth to raking position will be resumed in the manner hereinabove explained.

The yieldable member 22 is not indispensable but is preferably used for the reason that it takes up the slack of the plate 18, and causes the bearing 32 to pass around and return on the underside of cam 35 and also operates to cause the bearing 32 to move more precisely about the cam 35 during its cycle of movement thereabout.

When the trip plate has resumed its original or initial position, and the rake head and teeth have moved by gravity into raking position, the parts will assume the position shown in Figure 1 and the dogs 10 will be held in released position out of engagement with the ratchet teeth 9, this result being accomplished and said relation of said parts being maintained through the lever 15 and the link 17, these parts operating to hold the trip plate 18 against movement.

The rake head 5 is provided with a forwardly curved stop 41 which engages underneath the cross bar 30 upon return movement of the rake head and this stop takes the shock of such return movement and relieves the link 17 and its connections therefrom.

The drawings and description disclose what is now considered to be a preferred form of the invention by way of illustration only while the broad principle of the invention will be defined by the appended claims.

What I claim is:

1. The combination with a hay rake having a frame, ground wheels, a rake head, and means for locking the rake head to rotate with the wheels, of means for controlling the action of the locking means comprising a member having connection therewith and movably mounted on the rake head, means under the control of the operator for manually effecting an initial movement of said member and for automatically completing said movement whereby a locking connection between the rake head and wheels is established, means acting as a guide to control the completion of the movement of said member until said rake head has turned with the wheels through a predetermined distance.

2. The combination with a hay rake having a frame, ground wheels, a rake head, and means for locking the rake head to rotate with the wheels, of means for controlling the action of the locking means comprising a member having connection therewith and movably mounted on the rake head, means under the control of the operator for effecting an initial movement of said member and for automatically completing said movement, whereby a locking connection between the rake head and wheels is established, means acting as a guide to control the completion of the movement of said member until said rake head has turned with the wheels through a predetermined distance, means acting to release said locking means to permit the return movement of the rake head, said guide means being also effective to prevent the locking of the rake head with the wheels until the said member has returned to initial position.

3. The combination with a self-dump hay rake having a frame, ground wheels, a rake head and means for locking the rake head to rotate with the wheels, of means for controlling the action of the locking means comprising a trip member having connection with said locking means and movably mounted on the rake head, means under the control of the operator for effecting an initial movement of said member whereby a locking connection is established between the rake head and the wheels, a pivotally mounted guide arranged to prevent return movement of said trip member until the rake head has turned with the wheels through a predetermined distance and also acting to prevent the locking of the rake head with the wheels until the trip member has returned to initial position, and oppositely acting yieldable members arranged to operate on the trip member.

4. The combination with a self-dump hay rake having a frame, ground wheels, a rake head, and means for locking the rake head to rotate with the wheels, of means for controlling the action of the locking means comprising a trip member pivotally mounted on the rake head and having connection with said locking means, means under the control of the operator including a lever and a link, said link having a slidable, pivotal connection with the trip member and being movable into one position to hold said trip member in inoperative, or inactive, position and movable into another position to effect the initial movement of said trip member whereby a locking connection is established between the rake head and the wheels, said lever forming means for actuating the link into and for holding the same in, either of said positions.

5. In a hay rake having a frame, ground wheels, a rake head and means for locking the rake head to rotate with the wheels; means for controlling the action of the locking means comprising a trip member having connection with said locking means and movably mounted on the rake head, means under the control of the operator for effecting an initial movement of said trip member and automatic means for continuing said movement whereby a locking connection between the rake head and wheels is established to cause the rake head to rotate with the wheels to dumping position, means acting to release said locking means to permit the rake head to return to original position, said trip member forming means to also hold said rake head in said original position.

6. In a hay rake having a frame, ground wheels, a rake head, and means for locking the rake head to rotate with the wheels; means for controlling the action of the locking means comprising a trip member having connection with said locking means and pivotally mounted on the rake head, means under the control of the operator for effecting initial movement of said trip member whereby a locking connection between the rake head and wheels is established, means acting to release said locking means to permit return movement of the rake head, and means associated with the trip member and arranged to be interlocked therewith through which said return movement of the released rake head may be suspended by the operator.

7. In a hay rake having a frame, ground wheels, a rake head, means for locking the rake head to rotate with the wheels; means for controlling the action of the locking means comprising a trip member having connection with said locking means and movably mounted on the rake head, means under the control of the operator for effecting an initial movement of said trip member whereby a locking connection between the rake head and wheels is established to cause the rake head to move with the wheels to dumping position, a pivotal guide controlling the return of the trip member, said trip member acting to retain said locking connection until the rake head has turned with its wheels through a predetermined distance.

8. In a hay rake having a frame, ground wheels, a rake head, and means for locking the rake head to rotate with the wheels; means for controlling the action of the locking means comprising a trip member connected with the locking means and movably mounted on the rake head, means under the control of the operator for effecting an initial movement of said trip member whereby a locking connection between the rake head and wheels is established to cause the rake head to rotate with the wheels to dumping position, a cam forming a guide and means on the trip member arranged to coact with the guide to control the return movement of the trip member, said operator controlled means also acting as a stop to arrest the movement of the trip member and to thereby cause the release of the locking means to permit the return movement of the rake head.

9. In a hay rake having a frame, ground wheels, a rake head and means for locking the rake head to rotate with the wheels; means for controlling the action of the locking means comprising a trip member having connection with the locking means and pivoted to the rake head, means under the control of the operator for effecting the initial movement of the trip member whereby a locking connection is established between the rake head and the wheels to cause the rake head to move with the wheels to dumping position, a cam pivotally mountd relative to the frame, said trip member having an extended arm provided with a bearing which moves about said cam, as a guide, to control the return movement of said trip member.

10. In a hay rake having a frame, ground wheels, a rake head and means for locking the rake head to rotate with the wheels; means for controlling the action of the locking means comprising a trip member having connection with the locking means and pivoted to the rake head, means under the control of the operator for effecting the initial movement of the trip member whereby a locking connection is established between the rake head and the wheels to cause the rake head to move with the wheels to dumping position, a cam pivotally mounted relative to the frame, said trip member having an extended arm provided with a bearing which moves about said cam, as a guide, to control the return movement of said trip member, and means for limiting the range of movement of said cam.

In testimony whereof I have signed my name to this specification.

WALTER F. MOTTIER.